US010540598B2

(12) United States Patent
Wasserkrug et al.

(10) Patent No.: US 10,540,598 B2
(45) Date of Patent: *Jan. 21, 2020

(54) INTERPOLATION OF TRANSITION PROBABILITY VALUES IN MARKOV DECISION PROCESSES

(71) Applicant: International Business Machines Corporation, Armonk, NY (US)

(72) Inventors: Segev Wasserkrug, Haifa (IL); Alexander Zadorojniy, Haifa (IL); Sergey Zeltyn, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1130 days.

This patent is subject to a terminal disclaimer.

(21) Appl. No.: 14/848,363

(22) Filed: Sep. 9, 2015

(65) Prior Publication Data

US 2017/0068897 A1    Mar. 9, 2017

(51) Int. Cl.
*G06N 7/00* (2006.01)
(52) U.S. Cl.
CPC .................................. *G06N 7/005* (2013.01)
(58) Field of Classification Search
CPC ............ G06N 5/04; G06N 7/00; G06N 5/045; G06N 7/005; G06N 5/046; G05B 13/00;
(Continued)

(56) References Cited

U.S. PATENT DOCUMENTS 7,363,515 B2 * 4/2008 Frazier .................. G06F 21/316
342/13
8,417,360 B2 * 4/2013 Sustaeta ............... G05B 13/024
700/28

(Continued)

FOREIGN PATENT DOCUMENTS

WO        200129692        4/2001

OTHER PUBLICATIONS

Peiter Abbeel, Discretization of Continuous State Spaced MDP's, University of California at Berkeley Department of Electrical Engineering and Computer Sciences, Oct. 22, 2011 (Year: 2011).*
Gosavi, Abhijit; Solving Markov Decision Processes via Simulation; 2014, pp. 1-40. (Year: 2014).*
Dalamagkidis, Konstantinos et al.; Autonomous Autorotation of Unmanned Rotorcraft using Nonlinear Model Predictive Control; Springer 2010; J Intell Robot Syst 57:351-369;. (Year: 2010).*

(Continued)

*Primary Examiner* — Stanley K. Hill
(74) *Attorney, Agent, or Firm* — G. E. Ehrlich

(57) ABSTRACT

According to some embodiments of the present invention there is provided a method for determining a control action in a control system using a Markov decision process. The method comprises an action of receiving two or more predefined transition probability values of a Markov decision process (MDP) of a control system, where each of the predefined transition probability values is associated with a transition between a first state and a second state, both from two or more system states, resulting from execution of one or more control actions of the control system. The method comprises an action of computing one or more new transition probability values by an analysis of the predefined transition probability values, the system states and the control actions. The method comprises an action of determining one or more recommended control actions for the respective system state based on the new transition probability value.

17 Claims, 3 Drawing Sheets

Figure 1:
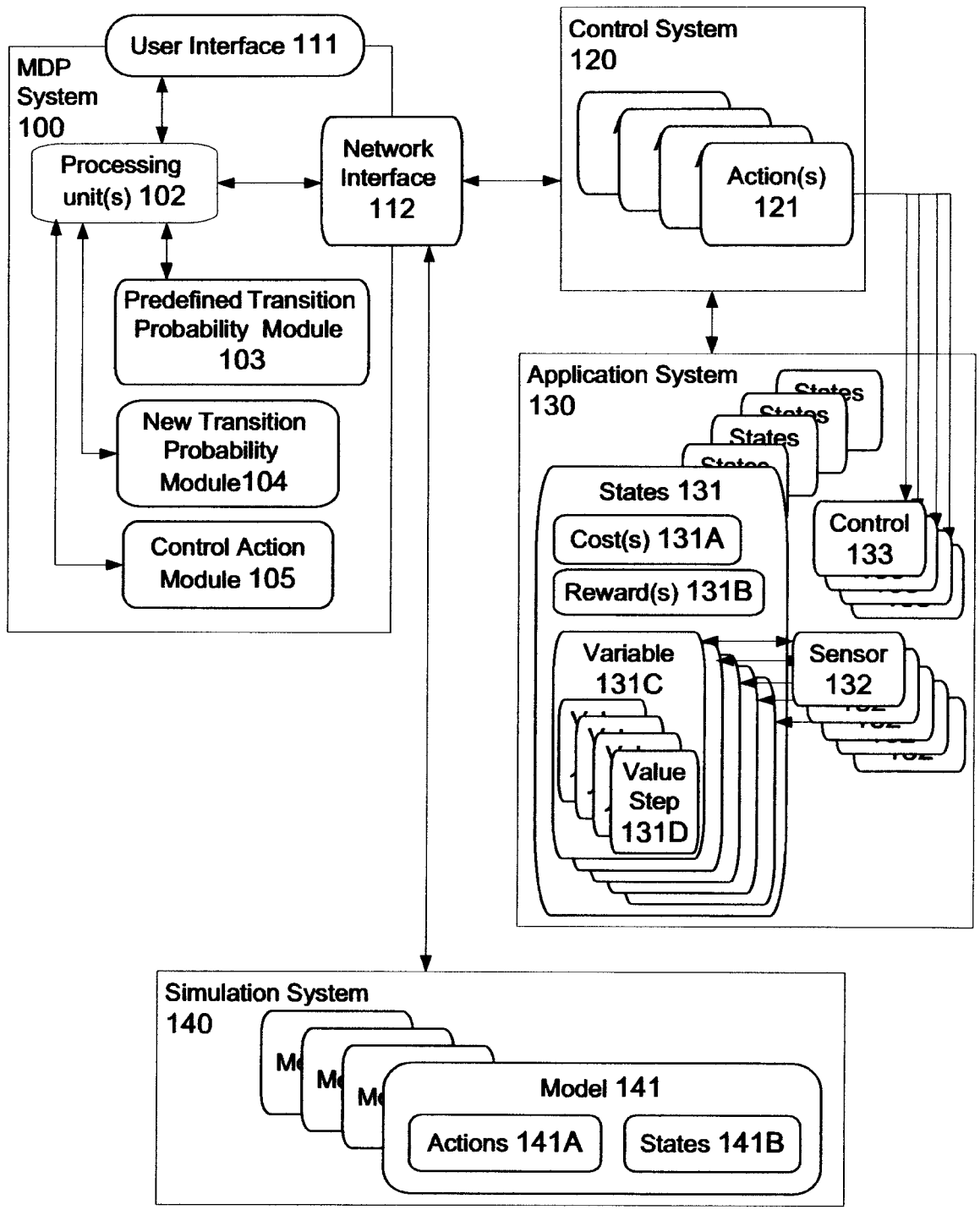

(58) Field of Classification Search
CPC .. G05B 13/021; G05B 13/024; G05B 13/026; G05B 17/02

See application file for complete search history.

(56) References Cited

U.S. PATENT DOCUMENTS

| | | | |
|---|---|---|---|
| 8,655,822 B2 | 2/2014 | Levchuk et al. | |
| 8,725,510 B2 | 5/2014 | Yoshiike et al. | |
| 9,009,095 B1* | 4/2015 | Fafri | G06F 17/18 706/52 |
| 2004/0263388 A1* | 12/2004 | Krumm | G01C 21/206 342/451 |
| 2009/0299496 A1* | 12/2009 | Cade | G05B 13/024 700/29 |
| 2011/0010176 A1* | 1/2011 | Yoshiike | G06N 99/005 704/256.2 |
| 2012/0066168 A1* | 3/2012 | Fadell | G05B 15/02 706/52 |
| 2013/0066816 A1* | 3/2013 | Shimomura | G06N 7/005 706/12 |
| 2015/0019241 A1 | 1/2015 | Bennett et al. | |

OTHER PUBLICATIONS

Marbach, Peter et al.; Simulation-Based Optimization of Markov Reward Processes; IEEE Transactions on Automatic Control, vol. 46, No. 2; 2001; pp. 191-209. (Year: 2001).*

Chryssanthacopoulos, James P. et al.; Hazard Alerting Based on Probabilistic Models; Journal of Guidance, Control, and Dynamics vol. 35, No. 2, 2012; pp. 442-450. (Year: 2012).*

Sun, Zeyi et al.; Potential capability estimation for real time electricity demand response of sustainable manufacturing systems using Markov Decision Process; Elsevier 2014; Journal of Cleaner Production 65 (2014) 184-193. (Year: 2014).*

Ruschel, Edson et al.; Industrial maintenance decision-making: A systematic literature review; Elsevier; Journal of Manufactoring Systems 45 (2017) 180-194. (Year: 2017).*

Derya Sever et al., Dynamic Shortest Path Problem with Travel-Time-Dependent Stochastic Disruptions: Hybrid Approximate Dynamic Programming Algorithms with a Clustering Approach, Research School for Operations Management and Logistics, 2013.

Mingyuan Zhong et al., "Aggregation Methods for Lineary-solvable Markov Decision Process", University of Washington, 2013.

* cited by examiner

INTERPOLATION OF TRANSITION PROBABILITY VALUES IN MARKOV DECISION PROCESSES

FIELD AND BACKGROUND OF THE INVENTION

The present invention, in some embodiments thereof, relates to control systems and, more specifically, but not exclusively, to using Markov decision processes (MDP) for determining optimal control actions of control systems.

The MDP are decision-making methods used when the decision outcome is determined in part randomly and in part controllably by a control system. In this scenario, the MDP method decides which control action at each time point is most likely to bring the system to optimal operational performance, such as when a cost function is minimized and/or a reward function is maximized. Each control action transitions the system from a beginning state to a new state, such as an ending state, where the new state may be determined, at least in part, by the control action chosen at that time point. Each control action is a combination of one or more control variable variables, such as a speed of a pump, the temperature of a boiler, an addition of a certain amount of a chemical, and the like. As used herein, the term control action means a specific action of changing a control variable to control a system at a specific discrete time point. Each system state is associated with one or more cost values and/or one or more reward values. The reward and cost values at each starting system state determine the optimum control action by computing a cost and/or reward function over the possible control actions for the ending system state. For example, when an optimal control action transitions the current system state to a new system state, the output value of the reward function may increase and/or the output value of the cost function may decrease.

The system state is a particular configuration of systems variables, such as a particular set of values for the system variables each acquired from a sensor. The values for each system variable are classified into steps, such that each value step of a variable is a unique variable state. For example, each variable state is a value of system sensor. Each unique set of value steps for the system variables is a particular system state, such as the values of all system sensors attached to the application system. As used herein, the term system state means a specific set of values for all system variables of a system under control by a control system. System variables may be of two types: controllable and action-independent system variables. For example, action-independent system variables in an example application of a wastewater treatment plant are influent flow, influent chemical load, electricity cost time period, and the like. Actions and controllable system variables do not affect action-independent system variables. Controllable system variables describe internal and/or output characteristics of the system, and controllable system variables may be affected by past actions and system variables of any type.

In an industrial system application, a sensor may be a temperature sensor, a position sensor, a pressure sensor, a flow sensor, a light sensor, a chemical species sensor, a pH sensor, a gas sensor, a fluid level sensor, a status sensor, a purity sensor, and the like.

To select the optimal control action of a given system state, previously recorded system state transitions and associated control actions are analyzed to determine the transition probabilities when the system was in the same situation, or system state. For example, the control action that has the highest probability of bringing the system to a new state that has a higher reward value and/or lower cost value may be selected as the optimal control action. For example, a cost and/or reward function are computed for multiple states and control actions for a time range under consideration, such as over the coming week. For example, the time range is a long-term time range extending over months, years and the like. These calculations may use dynamic programming and/or linear programming techniques to find the optimal control actions based on the cost and/or reward functions.

Thus the transition probability values, such as probability values organized in a transition probability matrix, constitute a key component of determining control actions in the MDP method. Most implementations of MDP methods use known transition probabilities from previously acquired system transition data and/or estimated transition probabilities from simulations of one or more system models. For example, transition data are sets of system sensor values acquired before and after a control action thereby recording the system state transition. As used herein, the term transition data means the beginning system state, the executed control action, and the ending system state of a system state transition. For example, transition data are sets of system sensor values simulated using one or more system models before and after a control action thereby recording the system state transition. The system models may be a series of equations that predict the changes to sensor values after execution of a control action. For example, the simulate changes to concentrations of chemical compounds after raising the temperature of a boiler according to a differential chemical equation.

MDP methods may be used to determine optimal operation, such as optimal decisions and/or control actions, in maintenance systems, health care systems, agriculture systems, management systems of water resources, wastewater treatment systems, and the like.

SUMMARY OF THE INVENTION

According to some embodiments of the present invention there is provided a method for determining a control action in a control system using a Markov decision process. The method comprises an action of receiving two or more predefined transition probability values of a Markov decision process (MDP) of a control system, where each of the predefined transition probability values is associated with a transition between a first state of two or more system states and a second state of the system states resulting from execution of one of two or more control actions of the control system. The method comprises an action of computing one or more new transition probability values by an analysis of the predefined transition probability values, the system states and the control actions. The method comprises an action of determining one or more recommended control actions from the control actions for the respective system state based on the new transition probability value.

Optionally, the analysis is an interpolation of at least some of the predefined transition probability values to compute the new transition probability values.

Optionally, each of the predefined transition probability values is computed by a processor from some of two or more sensor measurement values and some of two or more control measurement values acquired by an application system.

Optionally, the predefined transition probability values are computed by a processor of a simulation system from simulations of one or more system models of an application system, where the system models computes the second state as output when the first state and one of the control actions is received as input.

Optionally, each of the system states comprises two or more system variable values, where each of system variable values corresponds to a value of one of two or more sensors of an application system.

Optionally, the analysis is an average of some of the predefined transition probability values, where the corresponding system states are neighboring states having equal values for all but one of the system variable values.

Optionally, each of the system variable values are classified into a series of value steps and where the corresponding one unequal value of the system variable values is unequal by one of the values steps.

Optionally, the average of some of the predefined transition probability values are predefined transition probability values computed from a corresponding number of transitions greater than a threshold value.

Optionally, some of the system states are classified as controllable system states and the remaining of the system states are classified as action-independent system states, where the classification is made according to each of the system states being affected by the control system, and where the analyzing is performed by multiplying a sum of corresponding transition probabilities between the action-independent system states with a sum of corresponding transition probabilities between the controllable system states and the action-independent system states.

Optionally, the analyzing is assigning a minimum probability value to one of the new transition probability values when corresponding one of the predefined transition probability values are below the minimum probability value.

Optionally, each of the system states is associated with a reward value and/or a cost value, and where determining the new control action is further based on respective reward value and cost value.

Optionally, the new control action comprises two or more control actions and the corresponding reward value and cost value are used to compute a reward function and a cost function for the control actions.

Optionally, the application system is an industrial system and each of the sensors is a sensor from the group of a temperature sensor, a position sensor, a pressure sensor, a flow sensor, a light sensor, a chemical species sensor, a pH sensor, a gas sensor, a fluid level sensor, a status sensor, and a purity sensor.

Optionally, the receiving and computing are performed by a first processing unit and the determining is performed by a second processing unit.

Optionally, the control action is missing a predefined transition probability value, and where the simulations are control action driven simulations for computing the missing predefined transition probability value.

Optionally, the second state is missing a predefined transition probability value, and where the simulations are system state driven simulations for computing the missing predefined transition probability value.

According to some embodiments of the present invention there is provided a computer program product for determining a control action in a control system using a Markov decision process, the computer program product comprising a computer readable non-volatile storage medium. The medium has stored thereon first program instructions executable by a processor to cause the device to receive two or more predefined transition probability values of a Markov decision process (MDP) of a control system, where each of the predefined transition probability values is associated with a transition between a first state of two or more system states and a second state of the system states resulting from execution of one of two or more control actions of the control system. The medium has stored thereon second program instructions executable by a processor to cause the device to compute one or more new transition probability values by an analysis of the predefined transition probability values, the system states and the control actions. The medium has stored thereon third program instructions executable by a processor to cause the device to determine one or more recommended control actions from the control actions for the respective system state based on the new transition probability value.

According to some embodiments of the present invention there is provided a computerized system for determining a control action in a control system using a Markov decision process. The system comprises a network interface for receiving system state transition data from a simulation system and/or an application system. The system comprises one or more processing units. The system comprises one or more memory devices having processor instructions stored thereon. The processor instructions cause the processing unit(s) to perform the action of receiving two or more predefined transition probability values of a Markov decision process (MDP) of a control system, where each of the predefined transition probability values is associated with a transition between a first state of two or more system states and a second state of the system states resulting from execution of one of two or more control actions of the control system. The processor instructions cause the processing unit(s) to perform the action of computing one or more new transition probability values by an analysis of the predefined transition probability values, the system states and the control actions. The processor instructions cause the processing unit(s) to perform the action of determining one or more recommended control actions from the control actions for the respective system state based on the new transition probability value.

Optionally, the computerized system further comprises the processing unit(s) performing the action of sending the new transition probability value to one or more second processing units, where the determining is performed on the second processing unit.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention may involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2A:
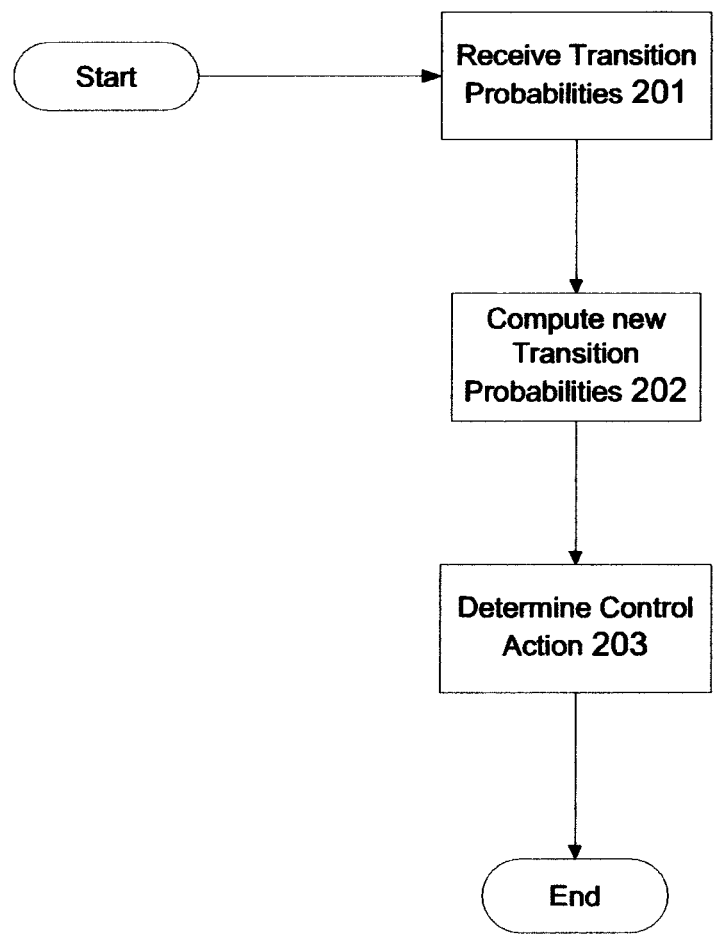
Figure 2B:
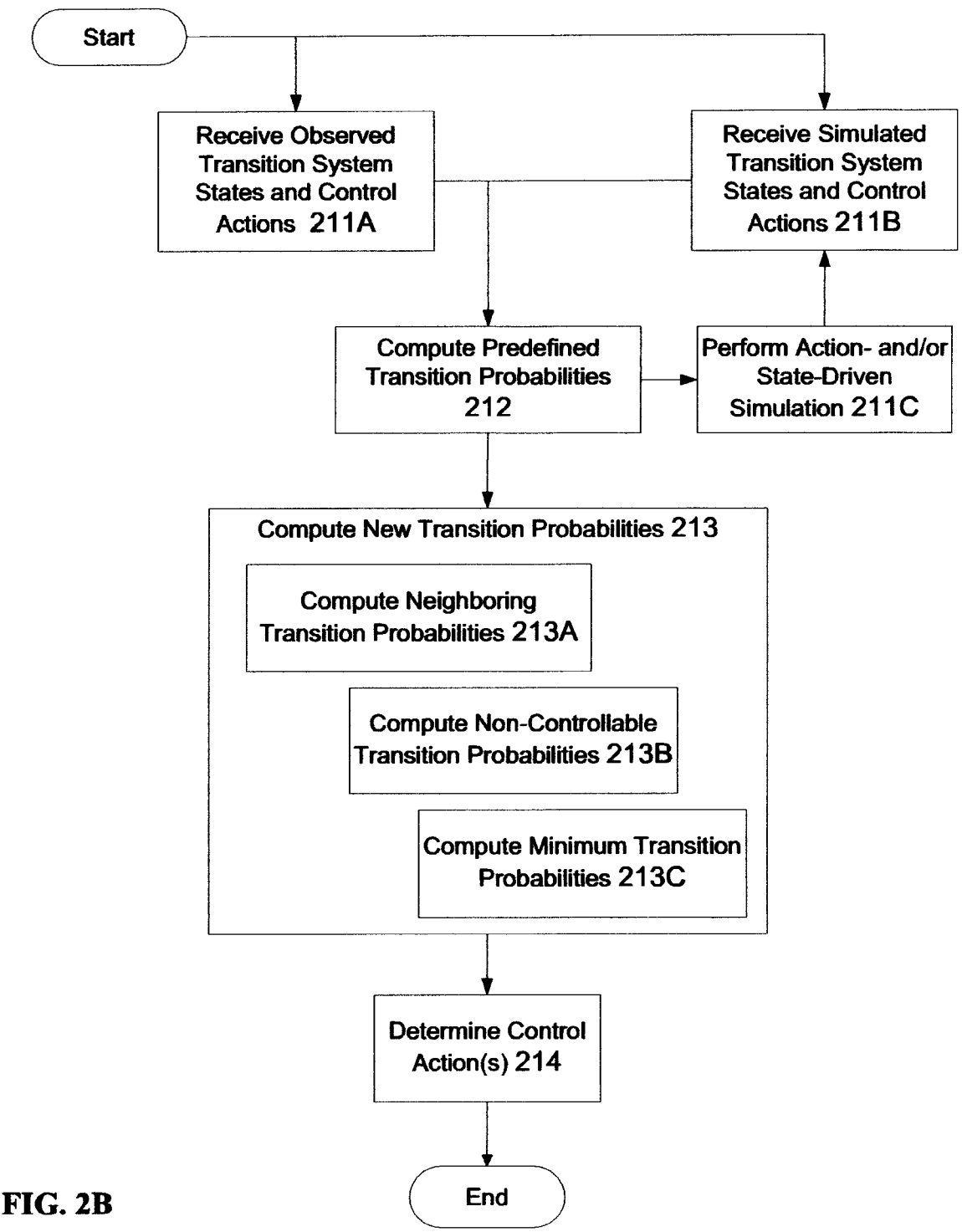

In the drawings:

FIG. 1 is a schematic illustration of a system for determining a system control action from computed new transition probability values in Markov decision processes, according to some embodiments of the invention;

FIG. 2A is a flowchart of a first method for determining a new control action from computed new transition probability values in Markov decision processes, according to some embodiments of the invention; and FIG. 2B is a flowchart of a second method for determining a new control action from computed new transition probability values in Markov decision processes, according to some embodiments of the invention.

DETAILED DESCRIPTION

The present invention, in some embodiments thereof, relates to control systems and, more specifically, but not exclusively, to using Markov decision processes (MDP) for determining optimal control actions of control systems.

The present disclosure uses operational optimization of a wastewater treatment plant (WWTP) as a possible application, but embodiments of the present invention are applicable to many systems that use probabilistic approaches to decision making. For example, embodiments of the present invention are applicable to maintenance systems, health care systems, agriculture systems, water resource management systems, queuing systems, epidemic process systems, robotic motion planning scenarios, and the like. Other applications for MDP methods incorporating embodiments of the present invention are described by White, D. J. in "A survey of applications of Markov decision processes" published in Journal of the Operational Research Society (vol., 44 (1993), no. 11, 1073-1096), which is incorporated by reference in its entirety.

Embodiments of the present invention are applicable to other probabilistic decision methods, such as Constrained Markov Decision Processes (CMDP). In CMDP, more than one cost value and/or function is used to find the optimal control action decision subject to one or more constraints. For example, specific constraints in a WWTP example application may be constraints on chemical agent levels in the plant outflow, such as ammonia level, nitrogen level, and the like.

In many MDP applications, including WWTP applications, the problem of estimating transition probability values constitutes a significant challenge even when the system is completely observable and/or measureable. The number of system states and control actions may be very large. For example, even a partial WWTP system involves more than 1000 system states and more than 100 control actions, where system states and control actions are as described above. Hence, in the WWTP example the MDP method requires measurement and/or simulation of more than $1000^2*100=100$ million transition probability values which gives rise to a number of challenges. First, it may be hard to estimate these probabilities from real system transition data, such as acquiring sets of system sensor values before and after executing a control action. For example, 10e+07 transition probability values may require at least 100 observations of each of some or all of the transitions for sufficient statistical power, for example requiring a total of millions or even billions of observable transitions under ideal uniform coverage. Second, estimation of transition probabilities to and from non-optimal states, that a reasonably managed system visits very rarely when at all, may not have sufficient transition data for statistical estimation. Third, some system states may not be observed, feasible and/or reachable at all during normal operation, such as during a WWTP plant startup stage, shutdown stage, following an unforeseen natural disaster, act of terrorism, intentional sabotage, and the like.

In some applications, including WWTP applications, simulations may estimate transition probability values. However, computerized simulators of complicated system models do not have enough processing power to cover all system states under all actions for a reasonable number of time points in order to get a reliable and straightforward statistical estimation in a reasonable amount of time. For example, WWTP simulation modeling involves solving a large number of differential equations related to different biochemical variables processes. Around 1,000 WWTP simulation days could be run in a single calendar day. The time interval between transitions may be equal to one hour. Hence, four days of simulation give approximately 100 thousand transitions: a small number given a problem size of 100 million transition possibilities.

A number of practical problems with applications using MDP may arise when a limited number of transition probabilities are available, such as absorbing states, reducible matrices where certain states cannot be reached from other states, and the like. Applying MDP methods to complex systems may require estimation of missing MDP transition probability values given a relatively small number of actual or simulation measurements. An additional challenge in these scenarios is how to select a subset of system states and control actions of system transitions that should be simulated when a simulation system is available for computing transition probability values considering that the simulation time is limited.

Therefore, real observed system transition data and even simulated transition data of complicated systems, such as in a WWTP example, often do not enable direct computation of the system state transition possibilities under all actions, such as when some system states are either not visited or rarely visited. This may adversely affect optimization algorithms due to absorbing states, transition probability values based on very small number of observations, and the like.

According to some embodiments of the present invention, there are provided systems and methods for computing new transition probability values of a MDP method from a relatively small number of predefined transition probability values. The predefined transition probability values may be computed from actual system state measurements or from simulations of one or more system models. The actual system variable values of system state measurements are received from sensors of the system, possible through the control system. The simulation transition data is received from a simulation system that uses one or more system models to simulate the beginning system state, the control action, and the ending system state. The computation of the new transition probability values takes into account the beginning system state, the control action performed and the ending system state of the system state transitions. For example, the beginning system state, the control action performed and the ending system state of the predefined transition probability values and the missing transition probability values are compared to find neighboring system states. In this example, the transition probability values of neighboring system states are averaged to determine the new transition probability values of rarely visited system states. Thus, the new transition probability values are estimates of missing transition probability values needed for determining optimal control actions in a MDP system and taking into account the system state transitions of previously known transition probability values. The new transition probability values allow the MDP system to compute the optimal control actions of the application system, where today there is no way to make this determination, as the transition data is not available. Thus, the operation of the MDP system and application system is improved.

Optionally, a new transition probability value is computed from the average of predefined transition probability values of all neighboring system states to the beginning and/or ending system state of the missing new transition probability value. Neighboring system states are defined as two system states where all system variables have equal values except for one system variable, and the unequal system variable values are ranked as adjacent steps of system variables values.

Optionally, a new transition probability value is computed from an analysis of controllable and action-independent system states. For example, a new transition probability value is computed by multiplying the sum of probabilities of transition between action-independent system states with the sum of probabilities of transition from all system states to the controllable system state.

Optionally, a new transition probability value is set to a minimum probability value. For example, when a transition probability matrix is not irreducible for some action i, then an optimization solution may indicate that some system states are not visited under optimal action and there may be no recommended action when the actual system visits this system state. In this example, the new transition probability values guarantee irreducibility and/or connectivity of transition probability matrices, such as guaranteeing a sequence of transition probabilities.

Before explaining one or more embodiments of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic illustration of a system determining a system control action from computed new transition probability values in Markov decision processes s, according to some embodiments of the invention. The MDP system 100 comprises a network interface 112, a user interface 111, and one or more processing units 102, such as one or more processors, computers, computerized systems, and the like. The MDP system 100 has stored thereon modules of processor instructions, such as modules containing computer code, for execution by the processing unit(s) 102. The network interface 112 may allow the device to exchange transition data, control actions, and the like, with one or more control systems 120, one or more application systems 130, one or more simulation systems, and/or the like. For example, sets of sensor values from acquired by sensors attached to the application system are received using the network interface 112 from the application system 130, control system 120, and the like. For example, previous transition beginning and ending system states, and control actions are received from the control system 120 using the network interface 112. The code in a predefined transition probability module 103 executed by the processing unit(s) 102 to compute predefined transition probabilities between states 131 of an application system 130 given an action 121 of a control system 120. Each control action 121 may change the value of a control 133 in the application system 130, such as a boiler temperature, a pump shaft rotation speed, a valve opening setting, and the like. Each system state 131 is associated with one or more cost values 131A, one or more reward values 131B, and two or more system variables 131C. Each system variable may be associated with a system sensor 132 and may comprise two or more value steps 131D for the sensor value. Each value step is a specific range of values for that specific sensor and associated system variable. The code of the predefined transition probability module 103 executed by the processing unit(s) 102 to compute predefined transition probabilities using a simulation system 140 and one or more system models 141. Each system model 141 computes two or more transitions, where each transition has simulated starting and ending system states 141B, and a simulated control action 141A.

The code of the new transition probability module 104 executed by the processing unit(s) 102 computes one or more new transition probability values by interpolating the predefined transition probability values. For example, the processing unit(s) 102 computes a new transition probability value from an average of neighboring predefined transition probability values. For example, the processing unit(s) 102 computes a new transition probability value from the transition probability values between action-independent system states and the transition probability values between all system states and controllable system states. For example, the processing unit(s) 102 computes a new transition probability value by setting the new transition probability value to the maximum of a predefined transition probability value and a minimum threshold probability value.

The code of the control action module 104 executed by the processing unit(s) 102 computes a preferred control action based on one or more new transition probability values and two or more predefined transition probability values.

The user interface 111 may allow an operator of the MDP system 100 to control the operation of the MDP system 100, the processing unit(s) 102, the processor instruction modules as at 103, 104 and 105, and the like.

Optionally, the MDP system and simulation system are incorporated into a single computerized device, optionally with multiple processors.

Optionally, the new transition probability module 104 is incorporated into a computerized device that is not part of the MDP system 100.

Reference is now made to FIG. 2A and FIG. 2B, which are a flowcharts of methods for determining a new control action from computed new transition probability values in Markov decision processes, according to some embodiments of the invention. The predefined transition probability module 103 contains processing instruction to receive 201 predefined transition probabilities by the processing unit(s) 102 of the MDP system 100, or to instruct the processing unit(s) 102 to compute 212 the probabilities from received transition data, such as measured transition data, simulated transition data, and the like. When the predefined transition probabilities values are computed 212, the received transition data may comprise observed transition states and control actions 211A of a system and/or simulated transition data 211B. For example, previously observed and/or recorded system state transition data and actual control actions are received by the processing unit(s) 102 from a repository, such as a hard disk, a database, a system archive, a digital data storage unit, and the like.

For example, application system sensor values are acquired and stored as the beginning system state. A control action is executed by a control system 120, such as the setting of a thermostat is changed from a value of 45 degrees Celsius to a value of 50 degrees Celsius. After a predetermined time, the ending system state is acquired by recording another set of the application system sensor values. The beginning state, control action and ending state is stored as the transition data. When enough transition data exists for a particular beginning system state, the transition probability values may be computed for the different control actions executed at that beginning system state. For example, the transition data contains a beginning system state, such as BSS1, that was observed in the application system 250 times, and each time the application system was in BSS1 one of three control actions, such as CA1, CA2 and CA3, was performed. The ending system state was one of five possible system states, such as ESS1, ESS2, ESS3, ESS4, and ESS5, and the transition probability values for all combinations of beginning system state, control actions, and ending system states are computed from the 250 observations.

For example, a WWTP system with a single state variable such as effluent level of total phosphorous concentration (TPC) may have a first state (S1) corresponding to TPC values between 0 and 0.5 mg/liter, a second state (S2) corresponding to TPC values between 0.5 and 1 mg/liter and, finally, a third state (S3) corresponding to TPC values that are greater than 1 mg/liter. A TPC value of 1 mg/liter is a typical regulatory constraint, and therefore, state S3 is undesirable and may have a higher cost value and/or lower reward value. In this example the addition of a chemical agent is the control action variable. Let three specific control actions be: no addition of the chemical agent (A1), addition of 100 liters of the chemical agent (A2) and addition of 200 liters of the chemical agent (A3). Let the transition data for the beginning state S2 consist of 300 observed transitions, 100 transitions for each action. After no addition of an agent (A1), 5 transitions resulting in ending state S1 are observed, 55 transitions resulting in ending state S2 are observed and 40 transitions resulting in S3 are observed. After addition of 100 liters of chemical agent (A2), 20 transitions resulting in state S1 are observed, 75 transitions resulting in state S2 are observed and 5 transitions resulting in state S3 are observed. After addition of 200 liters of agent (A3), 60 transitions to state S1 are observed, 39 transitions to state S2 are observed and one transition to state S3 is observed. The initial transitional probability vales computed from state S2 to states (S1, S2, S3) are (0.05, 0.55, 0.4) for action A1, (0.2, 0.75, 0.05) for action A2, and (0.6, 0.39, 0.01) for action A3, respectively.

For example, previously recorded simulated system state transition data and simulated control actions are received by the processing unit(s) 102 from a computerized storage unit. For example, a beginning system state is selected from a list of system states, such as a list of simulated sensor values, and the simulation system 140 executes a simulation of a system model 141 using that beginning system state and selecting a control action from a list of control actions 141B. The simulation system solves a series of model 141 equations describing the operation of the application system in that situation, resulting in a new set of simulated sensor values that comprise the ending system state 141A. When multiple transition data has been simulated for a particular beginning system state, the transition probability values may be computed for that beginning system state. The transition data and/or transition probability values may be stored on a system storage unit, such as a repository, a database, a hard disk, and the like, and later received by the processing unit(s) 102 for computing new transition probabilities. For example, the beginning system state, such as BSS1, was simulated by a system model in the simulation system 2250 times, and each time the application system was in BSS1 one of three control actions, such as CA1, CA2 and CA3, was simulated. The ending system state was one of five possible system states, such as ESS1, ESS2, ESS3, ESS4, and ESS5, and the transition probability values for all combinations of beginning system state, control actions, and ending system states are computed from the 2250 observations.

Optionally, transition probabilities values or transition data is received 211B according to an action-driven and/or a state-driven simulation 211C of one or more system models 141. For example, a simulation system 140 receives instructions from the processing unit(s) 102 of the MDP system 100 to perform simulation of application system transitions that may assist in computing new transition probability values according to embodiments of the invention. The action-driven simulation may simulate possible control actions from a starting system state by selecting control actions to simulate. For example, at a certain system state there are control actions that do not have associated transition probability values in the received transition data. These control actions are repeatedly simulated for the particular starting system state, and the resulting transition ending states are used to compute the new transition probability values. For example, in an action-driven simulation let j denote the current system state, and therefore j∈X where X denotes all possible system states. Choose the least chosen action, denoted i*, be computed by i*=arg min $V_j^i$, where $V_j^i$ denotes the number of times the system was in state j and control action i was performed. When there are several equally least chosen actions, one of the actions is randomly selected according to a uniform distribution.

A state-driven simulation may reach rare system states, such as states that are not ending system states of any received transition data. For example, in a state-driven simulation method let j denote the current system state, and therefore j∈X where X denotes all possible system states. Let $\overline{V_k} = \Sigma_{i=1}^{|U|} V_k^i$ denote the overall number of visits to state k∈X in the existing transition data, such as in observed and/or simulated transition data. Let $$W^i = \sum_{k=1}^{|X|} \frac{\hat{P}_{jk}^i}{\overline{V_k}},$$

where $\hat{P}_{jk}^{i}$ denotes the current transition probability value. Set action i*=arg min W$^i$ as the action to simulate. When there are several such actions, such as several minimum values of W$^i$, choose randomly from these actions according to a uniform distribution. State-drive coverage chooses actions that may imply visits to states with a high value of $1/\sqrt{V_k}$, such as to simulate transitions to rarely visited states.

Optionally, action-driven simulation is performed for a relatively large number of simulations to get a reasonable initial estimate of transition probability values, and then state-driven and action-driven simulations are performed alternately.

Before describing the computation of new transition probability values, as at 202 and 213, some notations used in the computations are now defined. As used herein, U denotes the set of all control actions and X denotes the set of all system states. The number of control action variables is denoted $N_a$. The number of control action values for each control action variable is denoted $N_a^i$ where $1 \le i \le N_a$. The overall number of control actions is $|U|=\Pi_{i=1}^{N_a} N_a^i$. The number of system state variables is denoted $N_s$. The number of variable values for each system state variable is denoted $N_s^i$, where $1 \le i \le N_s$. The overall number of system states is $|X|=\Pi_{j=1}^{N_s} N_s^j$.

Number of times state j is followed by action I is denoted $V_j^i$, where i∈U and j∈X. Number of transitions to ending system state k from beginning system state j after action i has been performed is denoted $V_{jk}^i$, where i∈U, j∈X, and k∈X. Computation of transition probabilities from observed and/or simulated transition data is performed according to the formula $$\hat{P}_{jk}^i = \frac{V_{jk}^i}{V_j^i},$$

where i∈U, j∈X, and k∈X.

The convention used when a state was not visited, such as when $V_j^i=0$, is $\hat{P}_{jj}^i=1$ and $\hat{P}_{jk}^i=0$ for j≠k.

Optionally, new transition probability values are computed 213A from neighboring state transition probability values. Neighboring states of state j∈X are the states such that all state variable values, except one, coincide with state variable values of system state j and the one different state variable is different by one ranking of values, such as one value step. For example, the difference by one value step corresponds to an adjacent value interval when discretization of a continuous variable to intervals is considered. For example, neighboring system states are two system states where all system sensor values are within the same value steps, or ranges, and one of the system sensor values are in adjacent value ranges between the two neighboring states.

For example, a system temperature sensor value in one system state is 99.4 degrees Celsius that corresponds to the value range of 98 to 102 degrees Celsius, and in the neighboring state the temperature sensor value is 103.2 degrees Celsius that corresponds to the value range of 102 to 106 degrees Celsius. In this example, all other system sensor values are within the same range in the two system states.

For example, let $L_j$ denote the set of both the neighboring system states of state j and system state j itself. Let $\tilde{L}_j^i$ denote a subset of $L_j$ that are the system states that were visited and followed by action i and $|\tilde{L}_j^i|$ is the size of this set.

The neighboring state computation 213A uses a parameter M≥0. The computation 213A is performed for actions and states where $V_j^i \le M$. The value of parameter M is typically M=10, but may also range between 1 and 1000. The new transition probability values may be computed 213A using the formula:

$$\tilde{P}_{jk}^i = \frac{\sum_{m \in \tilde{L}_j^i} \hat{P}_{jk}^i}{|\tilde{L}_j^i|}, k \in X.$$

Optionally, neighboring state computation 213A is performed iteratively, such as performed multiple repeated times. For example, two neighboring system states have transition probability values of 0.2 and 0.3 respectively, and the new transition probability value is computed as 0.25.

Following is a description of computing 213B new transition probability values of action-independent states. State variables may be divided into two types: controllable and action-independent state variables. Examples of action-independent state variables in the WWTP application include influent flow, influent chemical load, or type of time period according to electricity costs. Examples of controllable state variables in the WWTP application include internal nitrogen concentrations, internal ammonia concentrations, outflow nitrogen concentrations, outflow ammonia concentrations, and the like. Actions and controllable state variables do not affect transitions between action-independent state variables. Controllable state variables describe internal measures or output values of the system and may be affected by past actions and state variables of any type.

Following is introduced additional notation on these two types of state variables. The number of action-independent state variables is denoted I, where $0 \le I \le N_s$. Controllable variables may be at the beginning of a state variable list. Let $X_N$ and $X_C$ denote system states that correspond to action-independent and controllable system state variables, respectively. The full state space X is a Cartesian product of these two spaces: $X=X_N \times X_C$. The dimensions are $|X_N|=\Pi_{j=1}^{I} N_s^j$ and $|X_C|=\Pi_{j=I+1}^{N_s} N_s^j$, respectively. Let NS(j),j∈$X_N$, denote the set of action-independent states from the full state space that correspond to state j from the action-independent space $X_N$. In the other words, NS(j)={j}×$X_C$. Let CS(j),j∈$X_C$, denote the set of controllable states from the full state space that correspond to state j from the controllable space $X_C$. In the other words, CS(j)=$X_N$×{j}. Let H(k)∈$X_N$ where k∈X denote the action-independent part of state k and E(k) ∈$X_C$ denote the controllable part of state k. In the other words, state k is the concatenation of states H(k) and E(k).

Residual statistical variation and/or computing 213A neighboring probabilities may produce a significantly distorted transition probability matrix with respect to action-independent variables. For example, a distribution of action-independent state variables under one operational policy may be significantly different from a distribution of action-independent state variables under another policy. In order to correct this potential distortion, new transition probability values may be computed 213B for action-independent state transitions.

For example, estimates of action-independent transitional probabilities between action-independent states may be computed using the formula:

$$\hat{P}_{jk}^{N} = \frac{\sum_{i=1}^{|U|} \sum_{s \in NS(j)} \sum_{w \in NS(k)} V_{sw}^{i}}{\sum_{i=1}^{|U|} \sum_{s \in NS(j)} V_{s}^{i}}, j \in X_{N}, k \in X_{N}.$$

where the input $V_{sw}^{i}$, and $V_{s}^{i}$ are the measured and/or simulated transition data of the action independent states. The measured and/or simulated transition data may be received from a repository, simulation system, application system, and the like before any processing, such as transition probabilities computed from observed or simulated transition data. These transition probabilities may not be dependent on the control action.

For all actions i∈U, estimates of transitional probabilities from all system states to controllable system states may be computed with the formula:

$$\hat{P}_{jk}^{i,C} = \frac{\sum_{w \in cs(k)} V_{jw}^{i}}{V_{j}^{i}}, j \in X, k \in X_{C}.$$

where $V_{jw}^{i}$ and $V_{j}^{i}$ may denote results of neighboring transition probability computation 213A, when performed, or received transition data when neighboring transition probability computation 213A is not performed. These transition probability values are used to compute the new transition probability values using the formula:

$$\tilde{P}_{jk}^{i} = \hat{P}_{j,E(k)}^{i,C} \hat{P}_{H(j),H(k)}^{N}, j \in X, k \in X.$$

For example, a particular beginning system state j, a particular control action i, and a particular ending system state k have a controllable probability value $\hat{P}_{jk}^{i,C}$ of 0.1 and an action-independent probability value $\hat{P}_{H(j),H(k)}^{N}$ of 0.4, and a new transition probability value $\tilde{P}_{jk}^{i}$ is computed as 0.04.

When a transition probability matrix is not irreducible for some action i, then the optimization solution may indicate that some system states are not visited under optimal action. In this case, there may be no recommended action when the system visits this state and the following computation 213C of minimum new transition probability values may correct this. A parameter denoted ε, where 0≤ε≤1 and a value of ε=0.01 is typically assumed, allows computing a new transition probability value for a starting system state denoted $S_0$. The formula used for all actions i∈U and system states k∈X, is $\tilde{P}_{S_0,k}^{i} = \max(\hat{P}_{S_0,k}^{i}, \varepsilon/|X|)$. The formula used for all actions i∈U and system states j∈X, is $\tilde{P}_{j,S_0}^{i} = \max(\hat{P}_{j,S_0}^{i}, \varepsilon/|X|)$. The new transitional probabilities matrix may be normalized by dividing the values of each row by a number so that the sum of each row is equal to one. For example, a predefined and/or computed transition probability value $\hat{P}_{S_0,k}^{i}$ is 6.7e-9, a value of ε is chosen as 0.01, and there are 120 system states (|X|), and $\hat{P}_{S_0,k}^{i}$ is set to the value of ε/|X| or 8.3e-5.

Optionally, computing 213A a new transition probability value from neighboring state transition probability values is performed iteratively. For example, at each iteration the number of visits to neighboring states replaces $V_{j}^{i}$ in the threshold criteria, such as in parameter M.

Optionally, following a neighboring transition probability computation 213A, an action-independent state probability computation 213B is performed.

Optionally, following action-independent state probability computation 213B, a minimum transition probability computation 213C is performed.

Once sufficient new transition probability values have been computed, a control action may be determined 214 for a given starting system state based on the new transition probability values of actions, the cost values of the respective ending states, and/or the reward values of the respective ending states.

Optionally, the new transition probability values may be used to construct a series of control actions from the starting system state to one or more intermediate system states and an ending system state by computing a cost and/or reward function for all the intermediate system states. For example, a high transition probability to a low reward intermediate system state may be beneficial for optimal system performance by bringing the ending system state to a high reward state. For example, the cost and/or reward functions for the series of systems states comprises time values of the time between system state transitions according to the new transition probability values.

The methods as described above may be used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for optimizing a control action of a control system using a Markov decision process, by identifying a control action having a highest probability of bringing a respective controlled application system to a system state having an optimal combination of reward and cost values, comprising:

receiving a plurality of predefined transition probability values of a Markov decision process (MDP) of a control system, wherein each of said plurality of predefined transition probability values is associated with a transition between a first state of a plurality of system states and a second state of said plurality of system states resulting from execution of one of a plurality of control actions of said control system and wherein each of the plurality of system state is associated with at least one reward value and at least one cost value;

computing, by at least one hardware processor, at least one new transition probability value from an analysis of said plurality of predefined transition probability values, said plurality of system states and said plurality of control actions;

determining, by said at least one hardware processor, at least one recommended control action from said plurality of control actions for respective at least one of said plurality of system states based on said at least one new transition probability value, said recommended control action having a highest probability of bringing a respective application system, controlled by said control system, to a system state associated with the optimal combination of reward and cost values; and controlling said application system by providing said recommended control action for activation by said control system;

wherein each of said plurality of system states comprises a plurality of system variable values, each of said plurality of system variable values corresponds to a value measured by one of a plurality of sensors of said application system.

2. The method of claim 1, wherein said analysis is an interpolation of at least some of said plurality of predefined transition probability values to compute said at least one new transition probability value.

3. The method of claim 1, wherein each of said plurality of predefined transition probability values is computed by said at least one hardware processor from some of a plurality of sensor measurement values and some of a plurality of control measurement values acquired by said application system.

4. The method of claim 1, wherein said plurality of predefined transition probability values are computed by at least one hardware processor of a simulation system from simulations of at least one system model of said application system, wherein said at least one system model computes said second state as output when said first state and one of said plurality of control actions is received as input.

5. The method of claim 4, wherein a predefined transition probability value associated with said one of said plurality of control actions, is missing, and wherein said simulations are control action driven simulations for computing said missing predefined transition probability value.

6. The method of claim 4, wherein a predefined transition probability value, associated with said second state, is missing, and wherein said simulations are system state driven simulations for computing said missing predefined transition probability value.

7. The method of claim 1, wherein said application system is an industrial system and each of said plurality of sensors is a sensor from the group of a temperature sensor, a position sensor, a pressure sensor, a flow sensor, a light sensor, a chemical species sensor, a pH sensor, a gas sensor, a fluid level sensor, a status sensor, and a purity sensor.

8. The method of claim 1, wherein said analysis is an average of at least two of said plurality of predefined transition probability values, wherein corresponding said plurality of system states are neighboring states having equal values for all but one of said plurality of system variable values.

9. The method of claim 8, wherein each of said plurality of system variable values are classified into a series of value steps and wherein corresponding said one of said plurality of system variable values not having said equal value is unequal by one of said values steps.

10. The method of claim 8, wherein said average of said at least two of said plurality of predefined transition probability values are predefined transition probability values computed from a corresponding number of transitions greater than a threshold value.

11. The method of claim 1, wherein some of said plurality of system states are classified as controllable system states and the remaining of said plurality of system states are classified as action-independent system states, wherein said classification is made according to each of said plurality of system states being affected by said control system, and wherein said analyzing is performed by multiplying a sum of corresponding transition probabilities between said action-independent system states with a sum of corresponding transition probabilities between said controllable system states and said action-independent system states.

12. The method of claim 1, wherein said analyzing is assigning a minimum probability value to one of said at least one new transition probability values when corresponding one of said plurality of predefined transition probability values are below said minimum probability value.

13. The method of claim 1, wherein said at least one new control action is a plurality of control actions and corresponding said at least one of said reward value and said cost value are used to compute at least one of a reward function and a cost function for said plurality of control actions.

14. The method of claim 1, wherein said receiving and computing are performed by at least one first hardware processor and said determining is performed by at least one second hardware processor.

15. A computer program product for optimizing a control action of a control system using a Markov Decision Process (MDP), by identifying a control action having a highest probability of bringing a respective controlled application system to a system state having an optimal combination of reward and cost values, said computer program product comprising a non-transitory computer readable non-volatile storage medium having stored thereon:

first program instructions executable by a hardware processor to cause said device to receive a plurality of predefined transition probability values of a Markov Decision Process (MDP) of a control system, wherein each of said plurality of predefined transition probability values is associated with a transition between a first state of a plurality of system states and a second state of said plurality of system states resulting from execution of one of a plurality of control actions of said control system and wherein each of the plurality of system state is associated with at least one reward value and at least one cost value;

second program instructions executable by said hardware processor to cause said device to compute at least one new transition probability value by an analysis of said plurality of predefined transition probability values, said plurality of system states and said plurality of control actions;

third program instructions executable by said hardware processor to cause said device to determine at least one recommended control action from said plurality of control actions for respective at least one of said plurality of system states based on said at least one new transition probability value, said at least one recommended control action having a highest probability of bringing a respective application system, controlled by said control system, to a system state associated with the optimal combination of reward and cost values; and fourth program instructions executable by said hardware processor to cause said device to control said application system by providing said at least one recommended control action for activation by said control system;

wherein each of said plurality of system states comprises a plurality of system variable values, each of said plurality of system variable values corresponds to a value measured by one of a plurality of sensors of said application system.

16. A computerized system for optimizing a control action of a control system using a Markov Decision Process (MDP), by identifying a control action having a highest probability of bringing a respective controlled application system to a system state having an optimal combination of reward and cost values, comprising:

a network interface for receiving system state transition data from at least one of a simulation system and an application system;

at least one hardware processor; and at least one memory device having processor instructions stored thereon to cause said at least one hardware processor to perform the actions of:

receiving a plurality of predefined transition probability values of a Markov Decision Process (MDP) of a control system, wherein each of said plurality of predefined transition probability values is associated with a transition between a first state of a plurality of system states and a second state of said plurality of system states resulting from execution of one of a plurality of control actions of said control system and wherein each of the plurality of system state is associated with at least one reward value and at least one cost value;

computing at least one new transition probability value by an analysis of said plurality of predefined transition probability values, said plurality of system states and said plurality of control actions;

determining at least one recommended control action from said plurality of control actions for respective at least one of said plurality of system states based on said at least one new transition probability value, said at least one recommended control action having a highest probability of bringing a respective application system, controlled by said control system, to a system state associated with the optimal combination of reward and cost values; and controlling said application system by providing said recommended control action for activation by said control system;

wherein each of said plurality of system states comprises a plurality of system variable values, each of said plurality of system variable values corresponds to a value measured by one of a plurality of sensors of said application system.

17. The computerized system of claim 16, further comprising said at least one hardware processor performing the action of sending said at least one new transition probability value to at least one second hardware processor, wherein said determining is performed on said at least one second hardware processor.

* * * * *